Patented Aug. 20, 1935

2,012,228

UNITED STATES PATENT OFFICE 2,012,228

PURIFICATION OF 1-N-METHYL-4-HALOGEN-ANTHRAPYRIDONE

Edwin C. Buxbaum, Shorewood, Wis., assignor to E. I. du Pont de Nemours & Company, Wilmington, Del., a corporation of Delaware No Drawing. Application October 22, 1934, Serial No. 749,477

5 Claims. (Cl. 260—42)

This invention relates to the purification of 1-N-methyl-4-halogen-anthrapyridones to free the same from those impurities which on condensation with arylamines produce blue color bases.

In the preparation of 1-N-methyl-4-bromo-anthrapyridone by the acetylation of 1-methylamino-4-bromo-anthraquinone and subsequent ring-closure in alkaline solution, there is usually present in the resulting product certain compounds which on condensation with arylamines and subsequent sulfonation produce blue dyestuffs. The impurity which apparently predominates and which is objectionable in forming blue color bodies on condensation with arylamines is the 1-methylamino-4-bromo-anthraquinone, which remains in the product usually due to incomplete acetylation in the original step or due to hydrolysis of the acetylamino compound on treatment with alkali in the ring-closure of the acetyl body to the anthrapyridone. 1-N-methyl-4-bromo-anthrapyridone, when condensed with an arylamine such as para-toluidine and sulfonated, produces a red dyestuff generally known in the trade as Alizarine Rubinol R ("Colour Index" No. 1091). Small amounts only of the blue component, therefore, which result from the condensation of 1-methylamino-4-bromo-anthraquinone with para-toluidine materially alter the shade of the desired dyestuff. This same difficulty is experienced in the preparation of the corresponding 1-N-methyl-4-chloro-anthrapyridone. For convenience, however, the invention will be exemplified in connection with the 1-N-methyl-4-bromo compound.

It is an object of this invention to provide a simple and inexpensive method for the preparation of 1-N-methyl-4-halogen-anthrapyridones and to provide a process which will eliminate substantially all of those impurities which, on subsequent condensation with arylamines and sulfonation, form blue color compounds.

I have found that after ring-closing the acetyl-amino-anthraquinone compound in alkaline solution to the corresponding anthrapyridone, the impurities present in the ring-closed mass, and particularly those which on subsequent condensation with arylamines are converted to blue color bases, may be separated therefrom prior to condensation or put in a form which during the condensation with arylamines will not form color bases, thereby permitting separation of these impurities from the 1-N-methyl-4-halogen-anthrapyridone on its isolation or from the ultimate dyestuff after condensation with the arylamine. I have found that when 1-N-methyl-4-bromo-anthrapyridone, containing as an impurity 1-methylamino-4-bromo-anthraquinone, or other secondary or primary amines, is treated in sulfuric acid with nitrous acid, these secondary and primary amines are converted to compounds which will not form color bases under the conditions used in the condensation of the 1-N-methyl-4-bromo-anthrapyridone with arylamines.

This purification of the 1-N-methyl-4-bromo-anthrapyridone is brought about by dissolving or suspending the impure 1-N-methyl-4-bromo-anthrapyridone in sulfuric acid and adding thereto an inorganic or organic nitrite. The reaction may be carried out at temperatures varying from ordinary room temperature to about 160° C. When all of the impurities have been reacted with the nitrous acid, the mass is cooled and the anthrapyridone compound separated from the acid solution by diluting it with water, preferably to a concentration of between 70 and 80%, as more fully described in copending application Ser. No. 749,479.

The following examples are given to more fully illustrate my invention. The parts used are by weight.

Example 1

100 parts of the 1-acetylmethylamino-4-bromo-anthraquinone compound obtained by acetylation of the 1-methylamino-4-bromo-anthraquinone in the usual manner are suspended in 5000 parts of dilute alkali and boiled until the conversion of the acetyl compound into the ring-closed 1-N-methyl-4-bromo-anthrapyridone is complete. 100 parts of the crude pyridone as obtained above are dissolved in 500 parts of 93% sulfuric acid. The mixture is stirred until all the pyridone is in solution and then 15 parts of sodium nitrite are added over a period of a half hour. The mixture is heated to 80° and held there for three hours. The mixture is cooled to 30° and poured out into 6000 parts of cold water, filtered and washed acid free with warm water.

100 parts of the purified pyridone as above obtained are heated with 1000 parts of p-toluidine and 50 parts of sodium acetate at reflux temperature until conversion of the 1-N-methyl-4-p-toluido-anthrapyridone is complete. The product is isolated in the usual manner. This product on sulfonation by the known procedure gives Alizarine Rubinol R ("Colour Index" No. 1091), of pure shade, uncontaminated by the blue component usually formed from the 1-methylamino- 4-bromo-anthraquinone on its condensation with p-toluidine and subsequent sulfonation.

*Example 2*

15 parts of dry sodium nitrite are slowly added to 500 parts of 93% sulfuric acid under 30° with good agitation. After the addition of the nitrite, the mixture is stirred for ten minutes. 100 parts of impure 1-N-methyl-4-bromo-anthrapyridone containing as an impurity 1-methylamino-4-bromo-anthraquinone are added to the sulfuric acid. The mixture is heated to 80° C. over a period of one-half hour and held at 80°-82° C. for a period of three hours. 95 parts of water are added over a period of one hour. The mass is cooled to room temperature and agitated for eight hours. It is then filtered and washed acid free. The product is free from any impurity which on condensation with p-toluidine will give blue color bases.

*Example 3*

5 parts of sodium nitrite are added to 600 parts of 93% sulfuric acid at room temperature. The mass is agitated for ten minutes. A mixture consisting of 95 parts of crude 1-N-methyl-4-bromo-anthrapyridone, 3 parts of 1-methylamino-4-bromo-anthraquinone and 2 parts of 1-amino-2,4-dibromo-anthraquinone is added to the sulfuric acid-sodium nitrite solution. The reaction mass is heated to 110° and held at that temperature for four hours. The mass is cooled to 30° C. and poured out into 4000 parts of cold water, filtered and washed acid free. The yellow precipitate is sucked dry. The product so purified can be condensed with p-toluidine to form the red color base, which on sulfonation is substantially free from the objectionable blue components.

*Example 4*

150 parts of a 5% solution of nitrosyl sulfuric acid are mixed with 100 parts of 93% sulfuric acid. 50 parts of crude 1-N-methyl-4-bromo-anthrapyridone are added at 30° and the reaction mass heated to 75° C. over a period of one-half hour. The temperature is held at 75-80° C. for two hours, and then allowed to cool to 30° C. The mixture is poured into 2000 parts of cold water, filtered, and washed acid free.

*Example 5*

15 parts of sodium nitrite are added to 1000 parts of 93% sulfuric acid and allowed to dissolve. 100 parts of crude 1-N-methyl-4-bromo-anthrapyridone containing impurities such as 1-methylamino-4-bromo-anthraquinone are added to the sulfuric acid solution of sodium nitrite. The acid mixture is agitated at 25-30° C. for a period of eight hours or until a drop of the reaction mixture in water shows a bright yellow precipitate.

The reaction mixture is then poured out into 10000 parts of cold water and isolated in the usual manner.

*Example 6*

20 parts of crude 1-N-methyl-4-bromo-anthrapyridone are suspended in 600 parts of glacial acetic acid. The mixture is heated to a reflux temperature or until solution is complete. 10 parts of solid sodium nitrite are then added carefully over a period of one-half hour. The reaction mass is refluxed for two hours and cooled to room temperature. The cold suspension is filtered and washed acid free with hot water. Most of the nitrosated impurities remain in the mother liquors, leaving pure 1-N-methyl-4-bromo-anthrapyridone.

*Example 7*

100 parts of crude 1-N-methyl-4-bromo-anthrapyridone are added to 2000 parts of a 5% solution of sulfuric acid. The suspension is heated to a reflux and while boiling gently, 500 parts of a 4% solution of sodium nitrite are added over a period of 8–16 hours. The suspension gradually becomes yellower and brighter in shade. Filter hot and wash acid free with hot water. The product so obtained is substantially free of objectionable impurities.

The concentration of the acid used may vary from 1 to 100%, although sulfuric acid of about 93% concentration is preferred. Hydrochloric or other inorganic acids which in the concentrations used will not react with the anthrapyridone compound may be used. Organic acids such as acetic and formic have been found suitable. Either organic or inorganic nitrites may be used to produce the nitrous acid or nitrosyl sulfuric acid previously prepared may be employed.

The separation of the anthrapyridone compound from the sulfuric acid solution is brought about preferably by diluting the acid to a concentration of between 70 and 80%, whereby the anthrapyridone compound is precipitated, while the major portion of the impurities remains dissolved in the sulfuric acid. The anthrapyridone compound may be isolated from dilute acid solutions, however, as illustrated in the examples above given. Those impurities which may be thrown out with the anthrapyridone are eliminated after the condensation with the arylamines in the usual isolation procedure, since they no longer react with the arylamine to form objectionable color bases.

I claim:

1. In the preparation of 1-N-methyl-4-halogen-anthrapyridone, the step which comprises subjecting a crude 1-N-methyl-4-halogen-anthrapyridone to the action of nitrous acid at a temperature below 160° C.

2. In the preparation of 1-N-methyl-4-halogen-anthrapyridone, the steps which comprise subjecting a crude 1-N-methyl-4-halogen-anthrapyridone to the action of nitrous acid at a temperature below 160° C., in sulfuric acid, precipitating the 1-N-methyl-4-halogen-anthrapyridone by diluting the mass with water, and separating out the product so precipitated.

3. In the preparation of 1-N-methyl-4-bromo-anthrapyridone, the step which comprises subjecting a crude 1-N-methyl-4-bromo-anthrapyridone to the action of nitrous acid at a temperature below 160° C.

4. The process which comprises subjecting a crude 1-N-methyl-4-bromo-anthrapyridone to the action of a nitrite in sulfuric acid, precipitating the 1-N-methyl-4-bromo-anthrapyridone, and separating out the product so precipitated.

5. The process which comprises subjecting a crude 1-N-methyl-4-bromo-anthrapyridone to the action of a nitrite in sulfuric acid of substantially 93% at a temperature of from 25° to 80° C., precipitating the 1-N-methyl-4-bromo-anthrapyridone, and separating out the product so precipitated.

EDWIN C. BUXBAUM.